United States Patent [19]
Glaesener et al.

[11] Patent Number: 5,928,684
[45] Date of Patent: Jul. 27, 1999

[54] SECURING/CLAMPING ASSEMBLY FOR INJECTION MOLDING MACHINES

[75] Inventors: Pierre Glaesener, Bissen, Luxembourg; Martin Richard Kestle, Everett, Canada

[73] Assignee: Husky Injection Molding Systems Ltd., Canada

[21] Appl. No.: 08/914,589

[22] Filed: Aug. 18, 1997

Related U.S. Application Data

[63] Continuation of application No. 08/884,543, Jun. 27, 1997, Pat. No. 5,868,989, which is a continuation of application No. 08/482,870, Jun. 7, 1995, Pat. No. 5,645,875.

[51] Int. Cl.[6] .................................................. B29C 45/68
[52] U.S. Cl. .......................................... 425/589; 425/595
[58] Field of Search ...................... 425/589, 595

[56] References Cited

U.S. PATENT DOCUMENTS

| | | |
|---|---|---|
| 2,916,768 | 12/1959 | Quere et al. . |
| 2,976,569 | 3/1961 | Quere et al. . |
| 3,120,039 | 2/1964 | Stubbe et al. . |
| 3,183,555 | 5/1965 | Siegel . |
| 3,707,342 | 12/1972 | Lohmann . |
| 4,090,837 | 5/1978 | Balevski et al. . |
| 4,874,309 | 10/1989 | Kushibe et al. . |
| 5,135,385 | 8/1992 | Fukuzawa et al. . |
| 5,185,119 | 2/1993 | Schad et al. . |
| 5,238,394 | 8/1993 | Hirata . |
| 5,275,550 | 1/1994 | Romi . |
| 5,417,913 | 5/1995 | Arend ....................................... 425/589 |

FOREIGN PATENT DOCUMENTS

| | | |
|---|---|---|
| 0290858 | 4/1988 | European Pat. Off. . |
| 2390271 | 12/1978 | France . |
| 2064415 | 6/1981 | United Kingdom . |

*Primary Examiner*—Tim Heitbrink
*Attorney, Agent, or Firm*—Bachman & LaPointe, P.C.

[57] ABSTRACT

An securing/clamping assembly for clamping platens of an injection molding machine includes a mechanism for guiding the platens and a body member having a structure which is movable as a single unit. The body member is adapted to be attached with at least one of the platens and includes a mechanism for securing the mechanism for guiding and for conveying a clamping force to the platens for clamping the platens during injection molding. The mechanism for securing includes an engagement mechanism for placing the mechanism for securing into and out of locking engagement with the mechanism for guiding, such that when the engagement a mechanism is out of locking engagement with the mechanism for guiding, the body member and the mechanism for guiding are relatively movable.

30 Claims, 7 Drawing Sheets

SECURING/CLAMPING ASSEMBLY FOR INJECTION MOLDING MACHINES

This is a continuation of application Ser. No. 08/884,543, filed Jun. 27, 1997 now U.S. Pat. No. 5,868,989, which in turn is a continuation of application Ser. No. 08/482,870, filed Jun. 7, 1995, now U.S. Pat. No. 5,645,875.

BACKGROUND OF THE INVENTION

This invention is directed to injection molding machines, and more particularly, to an securing and clamping assembly for use with the bars of both singular and tandem injection molding machines.

The prior art includes many types of tie bar gripping and clamping assemblies for use with injection molding machines. The gripping of the bars via these assemblies allows for a high clamping force to be applied to the mold halves during injection molding. Typical tie bar gripping and mold clamping mechanisms are shown in the patents to Fukuzawa et al., U.S. Pat. No. 5,135,385; Romi, U.S. Pat. No. 5,275,550; Hirata, U.S. Pat. No. 5,238,394 and Kushibe et al., U.S. Pat. No. 4,874,309. In each of these patents, a combination tie bar gripping mechanism mold clamping unit is disclosed wherein the tie bar is gripped via clamping devices moving transverse the longitudinal direction of the tie bars.

Figure 5:
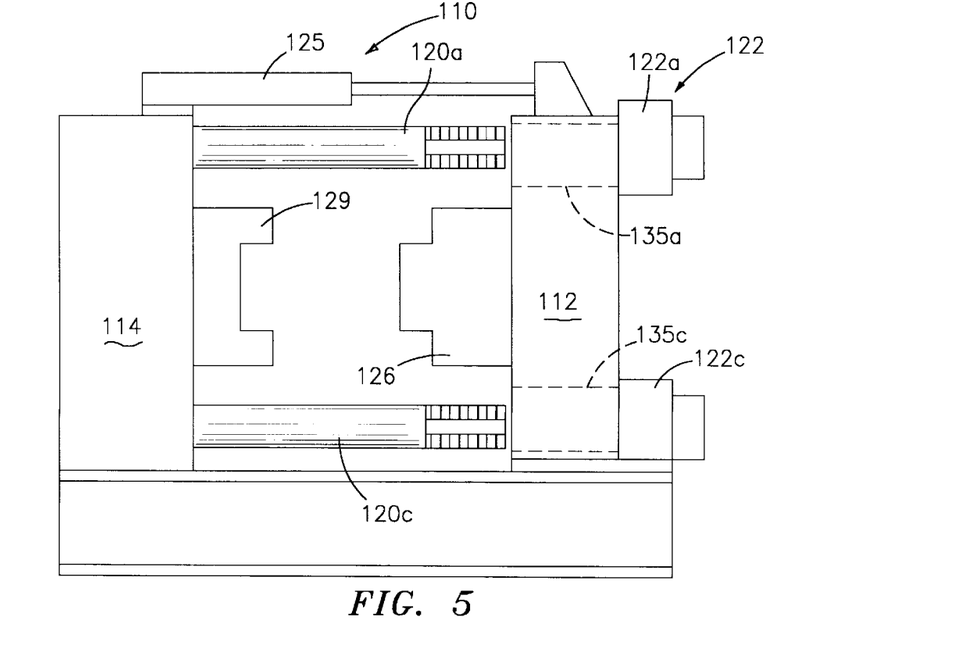
FIG. 5 is an elevational view of a single mold injection molding machine incorporating the principles of the present invention.

Accordingly, with reference to FIG. 5, Romi discloses the use of hydraulic clamps 9 and 10 for engaging circular grooves 18 of tie bar 17 for gripping the tie bars prior to the application of a clamping pressure via separate hydraulic cylinders 7. Similarly, Kushibe et al. discloses the use of halves 180 for clamping threads 172 of tie bar 164 so as to grip the tie bars prior to the application of a clamping force via separate hydraulic cylinders 160.

More particularly, the patent to Fukuzawa et al. discloses a clamping system which includes a fixed platen on one end of a machine base and a plurality of clamping cylinders wherein the fixed platen holds a fixed mold therein. A movable platen is fixed to the other end of the machine base and holds a movable mold therein, wherein a plurality of tie bars extend through the movable platen into the fixed platen. At one end of the tie bars, pistons are positioned wherein the pistons are slidably received within the clamping cylinders. In addition, the tie bars include screw threads or grooves on their end nearest the clamping cylinders. A unit is disposed between the movable platen and the fixed platen for moving the movable platen to and from the fixed platen. The movable platen includes two part nuts mounted therein for meshingly engaging additional screw threads or grooves positioned adjacent the end of the tie bar nearest the movable platen.

A further stopper mechanism is included in the movable platen which is engagable with recesses on the tie bars. The inner peripheral surfaces of the pistons include threads which are engageable with the screw threads or grooves on the tie bars adjacent the fixed platen. Accordingly, the pistons may be rotatable through means connected with a drive while engaged with the threads or grooves of the tie bars for adjusting the clamped position of the mold halves. Clamp position is adjusted by maintaining the female screw on the inner surface of the piston in meshed relationship with the screw portion at the end of the tie bar. By rotating the piston via a mechanism such as a sprocket and chain, the position of the mold halves can be adjusted as necessary. For this design, the threads on the inner surface of the piston are always maintained in meshed relationship with the threaded end of the tie bar and are used primarily for shut height adjustment.

Hirata discloses a mold clamping apparatus for a molding apparatus. The mold clamping apparatus includes a base, a fixed panel and a movable panel disposed on the base and respectively supporting mold halves. A plurality of tie bars each having a screw shaft at one end thereof pass through the movable panel toward the fixed panel. The plurality of clamping cylinders are disposed on the fixed panel for clamping another end of the tie bars when the mold apparatus is in a closed position. Each clamping cylinder includes cylinders 14 and semi-circular chucks 17 positioned transverse the longitudinal dimension of the tie bar. The cylinders 14 are actuated for gripping tie bar upon contact of the tie bar with a recess positioned in a primary piston of the clamping cylinder. Once cylinders 14 are engaged with tie bars 9, pressure can be applied to the primary piston 12 for providing the clamping force to the mold halves 25. The clamping apparatus further includes a mechanism for moving the movable panel towards and away from the fixed panel and an adjusting mechanism disposed on the movable panel, for simultaneously fixedly adjusting the axial position of the screws on the tie bar with respect to the movable panel so that molds of varying sizes can be accommodated. The secondary clamping pistons 14 and semi-circular chucks 17 are not rotatable into engagement with tie bars 9 and must be maintained in engagement with the tie bars during the application of pressure against primary cylinder 12.

The patents to Siegel, U.S. Pat. No. 3,183,555; Stubbe et al., U.S. Pat. No. 3,120,039 and Quere et al., U.S. Pat. No. 2,916,768 disclose further tie bar clamping mechanisms for use with molding machines. More particularly, Siegel discloses an expandable sleeve or bush 15 which envelopes the outer surface of a tie bar. The sleeve is adapted to engage inner walls of bores provided in a closing platen 9, wherein the bushes are adapted to receive guide columns or tie bars 4, such that the closing platen 9 is held on the guide columns by frictional contact. Stubbe et al. discloses the use of cylinders 21 having pistons 23 which are connected to levers 25 which in turn function to operate clamping jaws 26 for gripping shafts or tie bars 1. Quere et al. discloses the use of pistons for operating claws which rotate to grasp mating claws of tie bars moving from a movable platen 4 to stationary platen 7. The jaws are located in the stationary platen. Finally, European Patent 0290858 discloses the use of electromagnets 8 for clamping tie bar or column ends 7, for locking a movable tool clamping platen to a fixed tool clamping platen.

The patents to Schad et al., U.S. Pat. No. 5,185,119; Balevski et al., U.S. Pat. No. 4,090,837 and Lohman, U.S. Pat. No. 3,707,342, disclose different embodiments of tandem molding machines, i.e., wherein each machine has more than one mold. However, none of the tandem machines include tie bar securing/clamping mechanisms as discussed above or as disclosed in the present invention.

Schad et al. discloses an injection molding machine and method of operation having a plurality of accessory arrangements for molding a plurality of piece parts in efficient overlapping time cycle using primary and secondary molten plastic injection units, primary and secondary clamping units, and a plurality of injection units in various arrays including molding piece parts in reverse or uniform orientation. The tandem machine includes two fixed end platens and two center movable mold platens movable against and towards one of the fixed platens.

Lohman discloses a tandem injection molding apparatus having two molds, spaced apart with a dual nozzle injection unit positioned between the molds to fill the two molds alternately. The cooling periods of the two closed molds overlap in time and while one mold is cooling the other one is opened, emptied of its molded part, closed again and injected with a new charge of plastic. During the cooling period of one mold, the injection unit not only injects plastic into the other mold but also recharges for a new operating cycle. The machine includes a stationary side platen and movable center and other side platens.

There exists, therefore, a need for an improved tie bar securing/clamping assembly for use with single mold and tandem mold injection molding machines, wherein the securing/clamping assembly can be engaged and disengaged from the tie bar at each molding cycle.

SUMMARY OF THE INVENTION

The primary object of this invention is to provide an improved tie bar securing and mold clamping mechanism for use with both tandem and single mold injection molding machines.

Still another object of this invention is to provide a securing/clamping assembly for use with both tandem and single mold injection molding machines which provides the dual purpose of securing with tie bars and clamping mold halves closed for injection molding.

A still another object of this invention is to provide an improved securing/clamping assembly for use in both securing tie bars and clamping mold halves for injection molding which is actuated via rotational movement.

The foregoing objects are achieved by the securing/clamping assembly of the present invention for clamping platens of an injection molding machine, which includes means for connecting the platens and a body member having a structure which is movable as a single unit. The body member is adapted to be attached with at least one of the platens and includes means for securing the means for connecting and means for conveying a clamping force to the platens for clamping the platens during injection molding. The means for securing includes engagement means for placing the means for securing into and out of locking engagement with the means for connecting, such that when the engagement means is out of locking engagement with the means for connecting, the body member and the means for connecting are relatively movable.

The details of the present invention are set out in the following description and drawings wherein like reference characters depict like elements.

DETAILED DESCRIPTION OF THE PREFERRED EMBODIMENT

Figure 1:
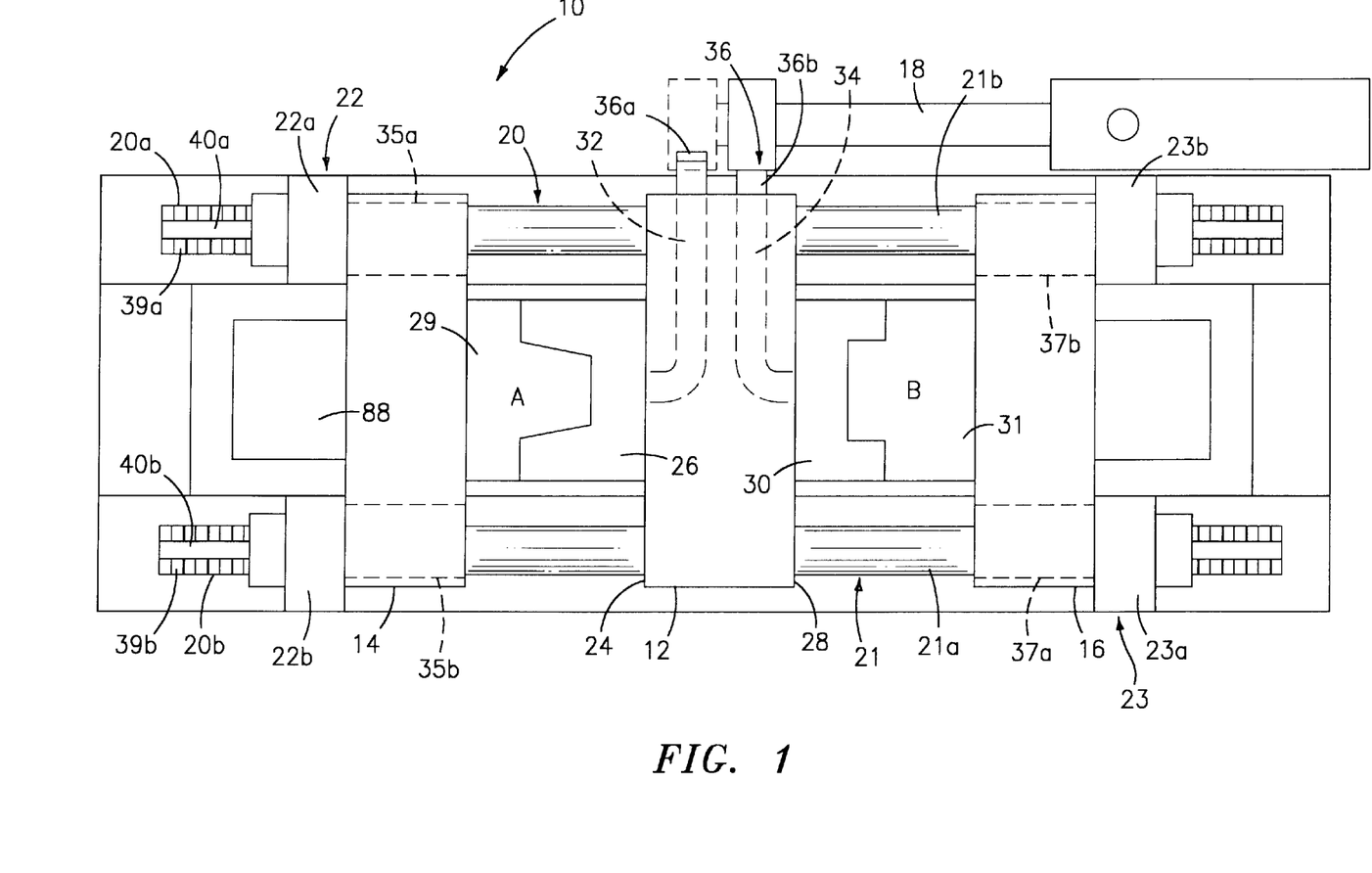
FIG. 1 is a simplified overhead view of a tandem injection molding machine having securing/clamping assemblies in accordance with the principles of the present invention.

Referring now to the drawings in detail, there is shown in FIG. 1, a simplified top view of a tandem injection molding machine designed in accordance with the principles of the present invention and designated generally as 10. Machine 10 generally includes a fixed center platen 12, a movable end platen 14, a movable end platen 16, an injection unit 18, tie bars 20 and 21 for guiding the movable platens and securing/clamping assemblies 22 and 23.

Figure 2:
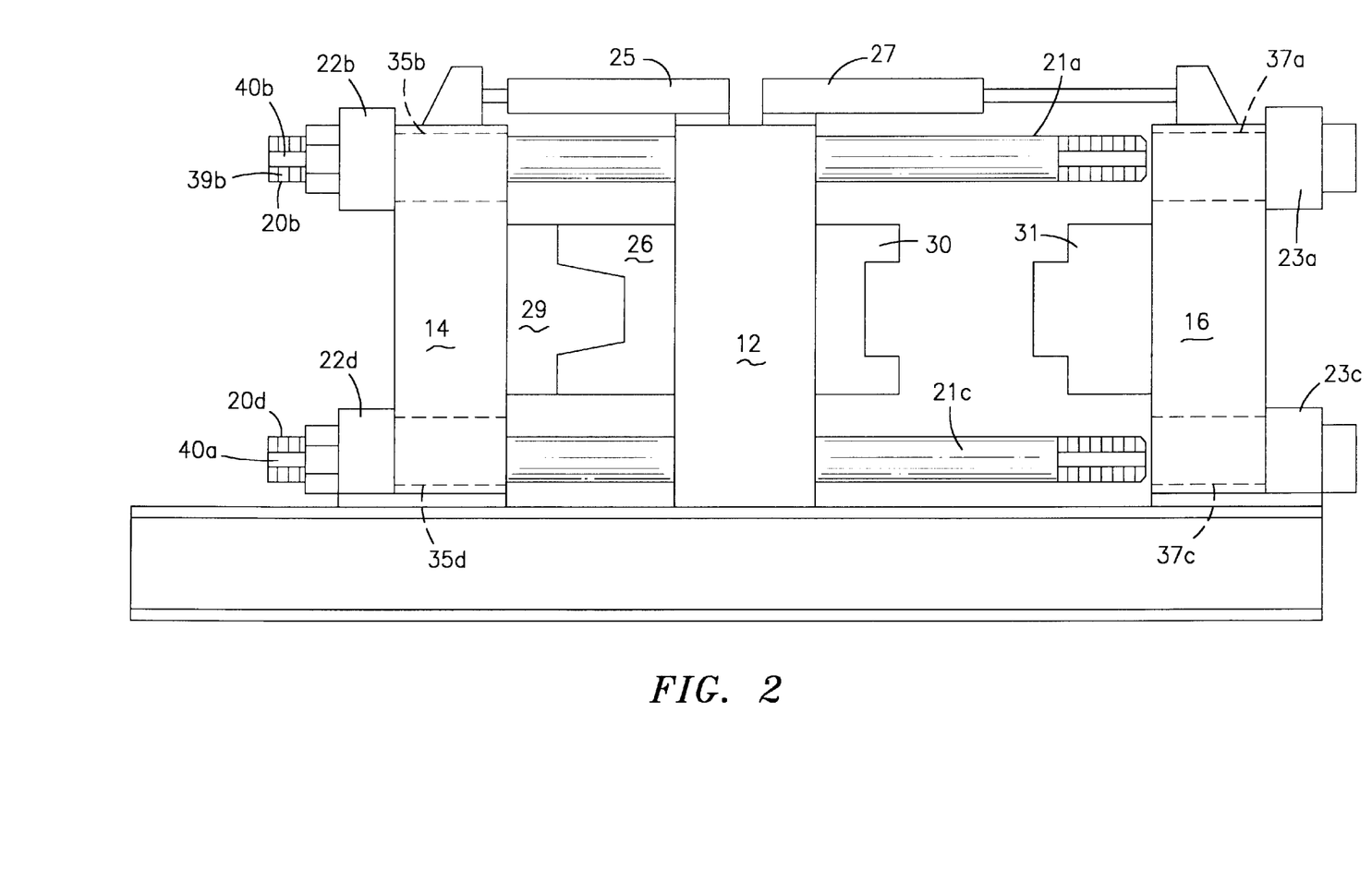
FIG. 2 is an elevational view of the tandem injection molding machine shown in FIG. 1.

In this embodiment, center platen 12 is fixed to a base and movable end platens 14 and 16 are movable away from and toward center platen 12 via positioning cylinders 25 and 27, respectively, as shown in FIG. 2. Center platen 12 includes a molding side 24 having a first stationary mold half 26 and a molding side 28 including a second stationary mold half 30. In addition, center stationary platen 12 includes a first hot runner 32 for directing melt to first stationary mold half 26 and a second hot runner 34 for directing melt to the second stationary mold half 30. Locking flanges 36a and 36b extend from the side of the fixed center platen for alternating engagement with injection unit 18. Alternatively, a single fixed connection could be used with a distribution valve to feed resin to either side of the center platen and respective mold. Movable platens 14 and 16 each include a movable mold half 29 and 31, respectively, for forming molds upon closing with stationary mold halves 26 and 30, respectively.

Referring to FIG. 1, and FIG. 2 showing an elevational view of machine 10 shown in FIG. 1, tie bars 20a–20d (20c not shown) extend from fixed center platen 12 toward movable end platen 14 and four tie bars 21a–21d (21d not shown) extend from fixed center platen 12 toward movable end platen 16. Tie bars 20a–20d and 21a–21d are arranged at the corners of the fixed center platen 12 such that when the mold is closed, they extend through securing/clamping assemblies 22a–22d (22c not shown) and 23a–23d (23d not shown), respectively, carried by, or within the movable end platens 14 and 16, respectively. The tie bars are preferably stationary while the movable platens move relative thereto and are supported on guide shoes such as shoe 33a shown in FIG. 3a.

Each of end platens 14 and 16 include four bores shown by dotted lines in FIGS. 1 and 2, 35a–35d (35c not shown) and 37a–37d (37d not shown), respectively, in which clamping and securing assemblies 22a–22d and 23a–23d, respectively, extend. Movable platen 14 and 16 preferably include fasteners, shown in FIG. 4, on the outwardly facing surface thereof for the securement of the securing/clamping assemblies, respectively.

The securing/clamping assemblies function to both grip or engage the tie bars and apply pressure to the mold halves during mold injection. Accordingly, from a general standpoint, each of the securing/clamping assemblies 22a–22d and 23a–23d include a mechanism for securely and positively engaging the tie bar, wherein the mechanism is further capable of conveying pressure to the platens for forcing the mold halves together during injection molding. Preferably, each securing/clamping assembly is formed from a body member having a structure which is movable as a single unit for securing with the tie bars and applying clamping pressure between the platens.

All of the securing/clamping assemblies, bores, and the tie bars are substantially the same and accordingly, only one securing/clamping assembly 22a, bore 35a and tie bar 20a are described in detail along with their associated elements, it being understood that the description applies equally to all securing/clamping assemblies, bores and tie bars and associated elements.

Figure 3A:
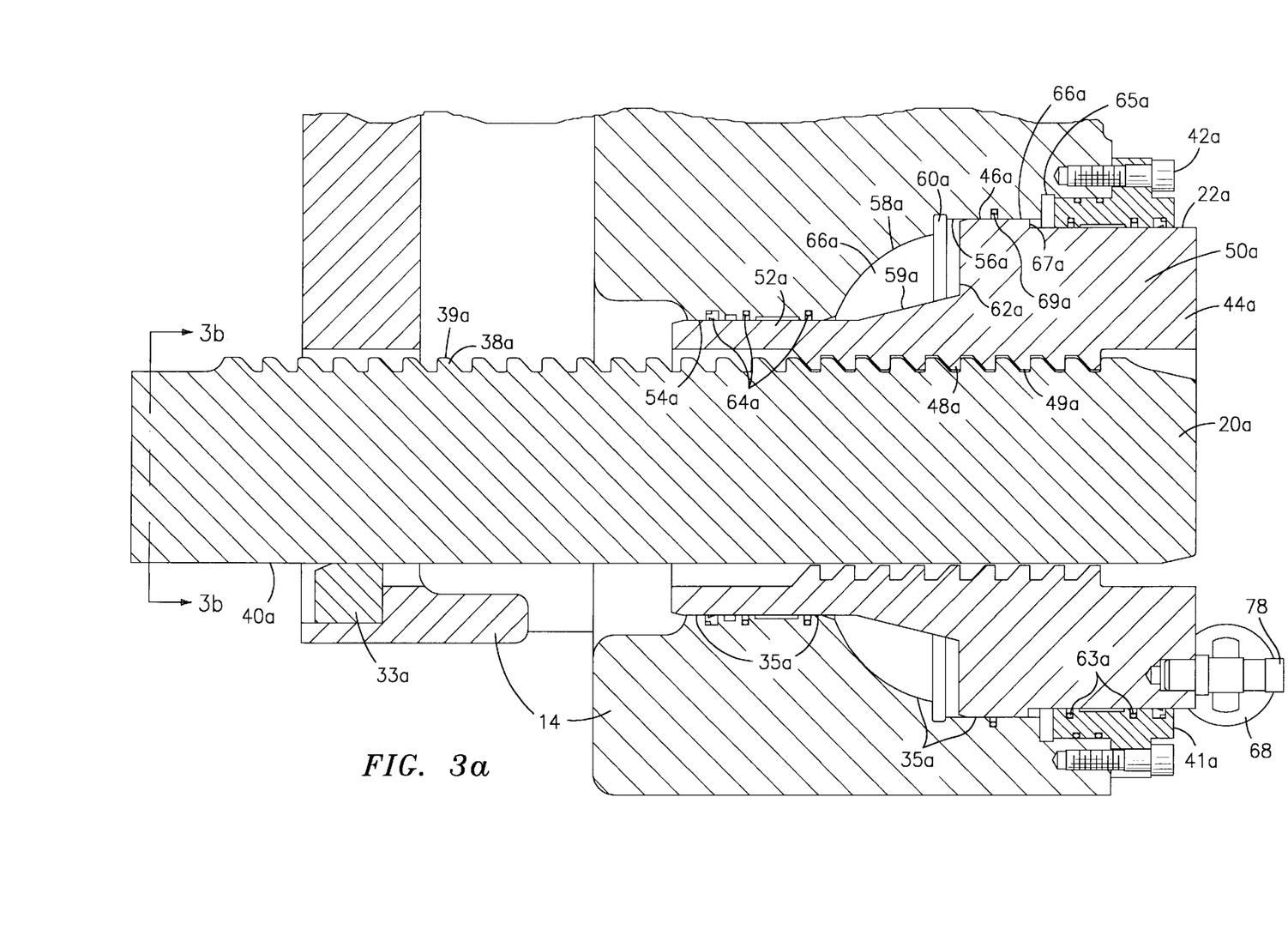
FIGS. 3a and 3b are detailed cross-sectional and end views of the securing/clamping assemblies in accordance with the principles of the present invention.
Figure 3B:
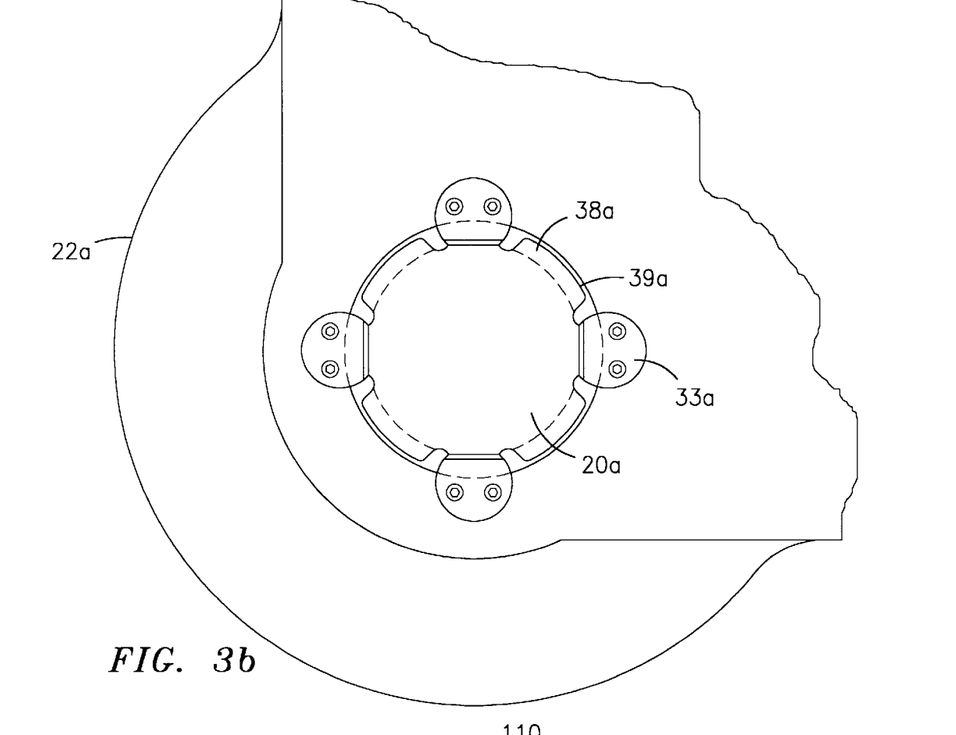
Figure 6A:
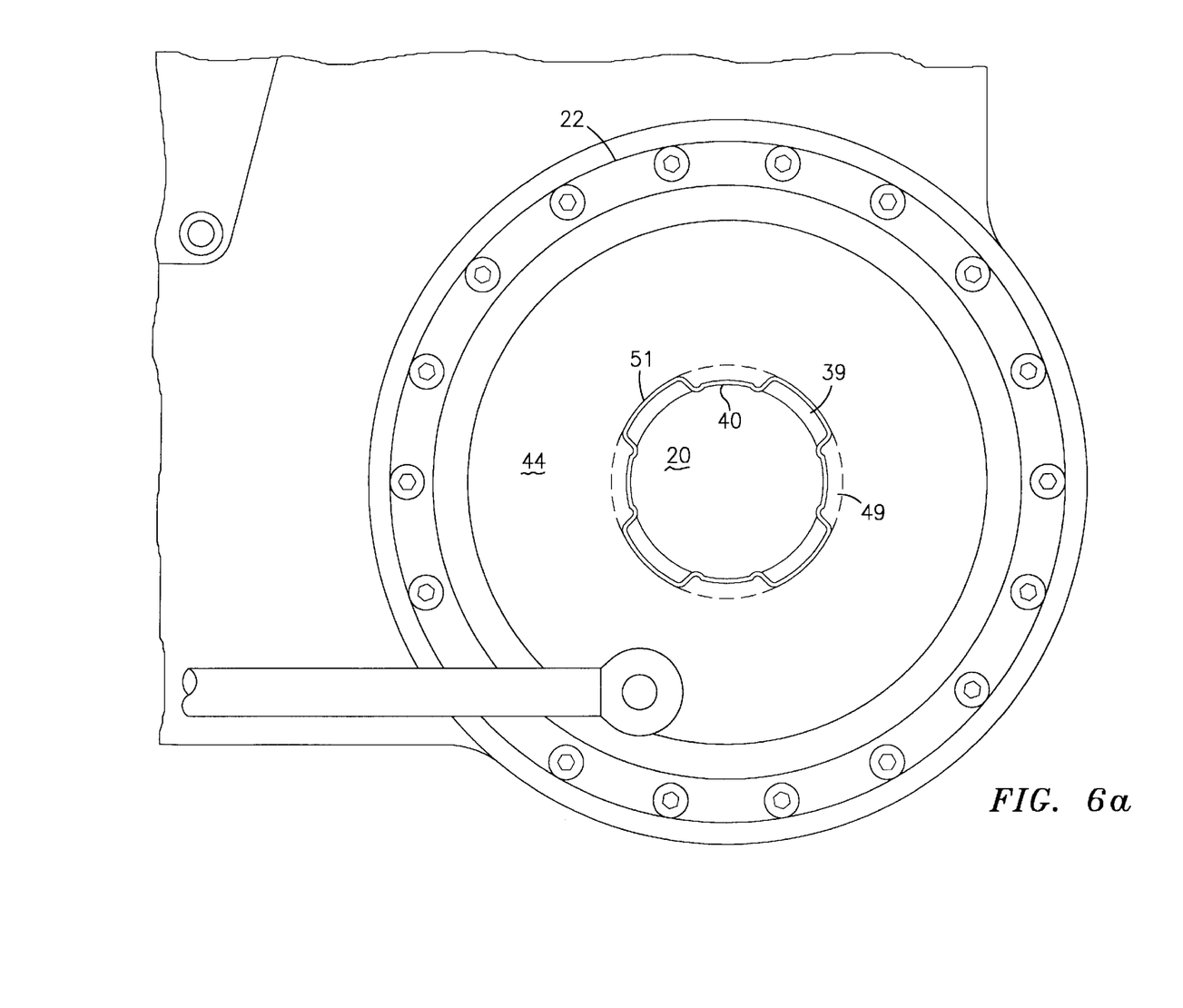
FIG. 6a is an enlarged view of the rotational mechanism shown in FIG. 4 in the disengaged position.

In a particular embodiment of the securing/clamping assemblies, securing/clamping assembly 22a is mounted on the outwardly facing side of movable end platen 14 and within bore 35a as shown in FIG. 1, and as discussed above. Referring to FIGS. 3a and 3b, in order for the securing/clamping assembly 22a of platen 14 to function with tie bar 20a, tie bar 20a includes an elongated end section having a plurality of spaced protrusions in the form of teeth 38a separated by longitudinally extending inner slots 40a, as shown in FIG. 6a. Accordingly, at the end of tie bar 20a is a toothed outer surface, as shown in FIG. 3a. The toothed outer surface of tie bar 20a is in the form of longitudinal outer strips of teeth 39a extending in the axial direction of the tie bar, wherein the teeth 38a are preferably aligned in a radial direction on the tie bar and separated by a space in the axial direction. Each of the strips of teeth such as strips of teeth 39a and 39b are radially separated from another strip of teeth via an outer axially extending slot, such as slots 40a and 40b. Outer strips of teeth 39a and slots 40a of tie bar 20a are adapted to engage and align, respectively, with inner teeth and grooves of securing/clamping assembly 22a, discussed below, in order to cause a locking engagement with the bar 20a.

Securing/clamping assembly 22a is positioned in bore 35a and is secured therein via retaining ring 41a, seals 63a and fasteners 42a, as shown in FIG. 3a. Securing/clamping assembly 22a is comprised of a member in the form of a piston 44a adapted to be positioned in bore 35a and coaxially relative to a tie bar 20a, as shown in FIGS. 3a and 3b. Piston 44a includes an outer surface 46a and an inner surface with axially extending teeth 48a separated by spaces in the axial direction, which are adapted to engage teeth 38a of the strips of teeth 39a of tie bars 20a. A slight axial clearance is provided between the teeth 38a of tie bars 20a and the inner teeth 48a of toothed piston 44a to allow for relative movement and position error adjustment during engagement of the teeth. In FIG. 3a, the top half of the figure shows locking engagement of teeth 38a of tie bar 20a with inner teeth 48a of piston 44a, and the clearance, while the bottom half shows non-engagement. Inner teeth 48a are included in a plurality of equally radially spaced and axially extending inner strips of teeth, such as 49a, which are radially separated from each other by inner slots 51a, as shown in FIG. 6a and axially separated by a space.

In order to achieve relative motion between securing/clamping assembly 22a and tie bar 20a, outer strips of teeth 39a of tie bar 20a are less in radial width than inner slots 51a of piston 44a and outer slots 40a of tie bar 20a are greater in radial width than inner strips of teeth 49a of piston 44a, thus allowing sufficient space for axial movement therebetween. During engagement or disengagement of strips of teeth 39a with strips of teeth 49a, teeth 38a do not extend into the spaces between teeth 48a or slots 51a, respectively, the entire depth of the spaces or slots thereby leaving a clearance between the teeth and piston bore. A clearance also preferably exists between teeth 48a and the innermost surfaces of tie bar 20, i.e. the surfaces defined by the spaces between teeth 38a or the surface of slots 40a.

Outer surface 46a of piston 44a has a stepped shape preferably including a base portion 50a having a wider diameter than a neck portion 52a. Bore 35a is shaped to closely receive piston 44a at the base and neck portion.

Accordingly, bore 35a has a smaller bore portion 54a having a diameter only slightly greater than the diameter of neck portion 52a and larger bore portion 56a having a diameter only slightly greater than the diameter of base portion 50a of piston 44a. Smaller bore portion 54a and larger bore portion 56a are circular in shape and are separated by an intermediate bore portion 58a having a hemispherical, tapered, stepped or other type of shape, the choice of which is not critical. Intermediate bore portion 58a begins at smaller bore portion 54a, expanding outwardly to its maximum diameter just prior to larger bore portion 56a. The maximum diameter of intermediate bore portion 58a is less than the outside diameter of larger bore portion 56a, and base portion 50a of piston 44a. Accordingly, a face 60a is formed between intermediate bore portion 58a and larger bore portion 56a against which axially transverse surface 62a of piston 44a can abut. Referring still to FIGS. 3a and 3b, seals 64a are provided between smaller bore portion 54a and neck portion 52a and seal 69a is provided between larger bore portion 56a and base portion 50a of piston 44a. Intermediate bore portion 58a is accordingly greater in diameter than the transitional area 59a between base portion 50a and neck portion 52a, defined in part by axially transverse surface 62a, of piston 44a. Accordingly, free space 66a is provided between bore 35a and piston 44a in the vicinity of the intermediate bore portion 58a. This space 66a is appropriately sealed via seals 64a and 69a, for the introduction of pressurized air, hydraulic or other fluid in order to provide a clamping pressure against surface 62a of piston 44a for pressing the movable platen 14 against the fixed center platen 12 during injection molding. Clamping pressure is released by releasing hydraulic pressure from space 66a and applying hydraulic fluid under pressure in cavity 65a against surface 67a of piston 44a. Before pressure is applied in space 66a against surface 62a so as to force movable platen 14 against the fixed center platen 12, inner strips of teeth 49a of piston 44a should first be engaged with outer strips of teeth 39a of tie bar 20a. Such locking engagement, and disengagement, of inner strips 49a with outer strips 39a is accomplished via rotational mechanism 68, shown in FIG. 4.

Figure 4:
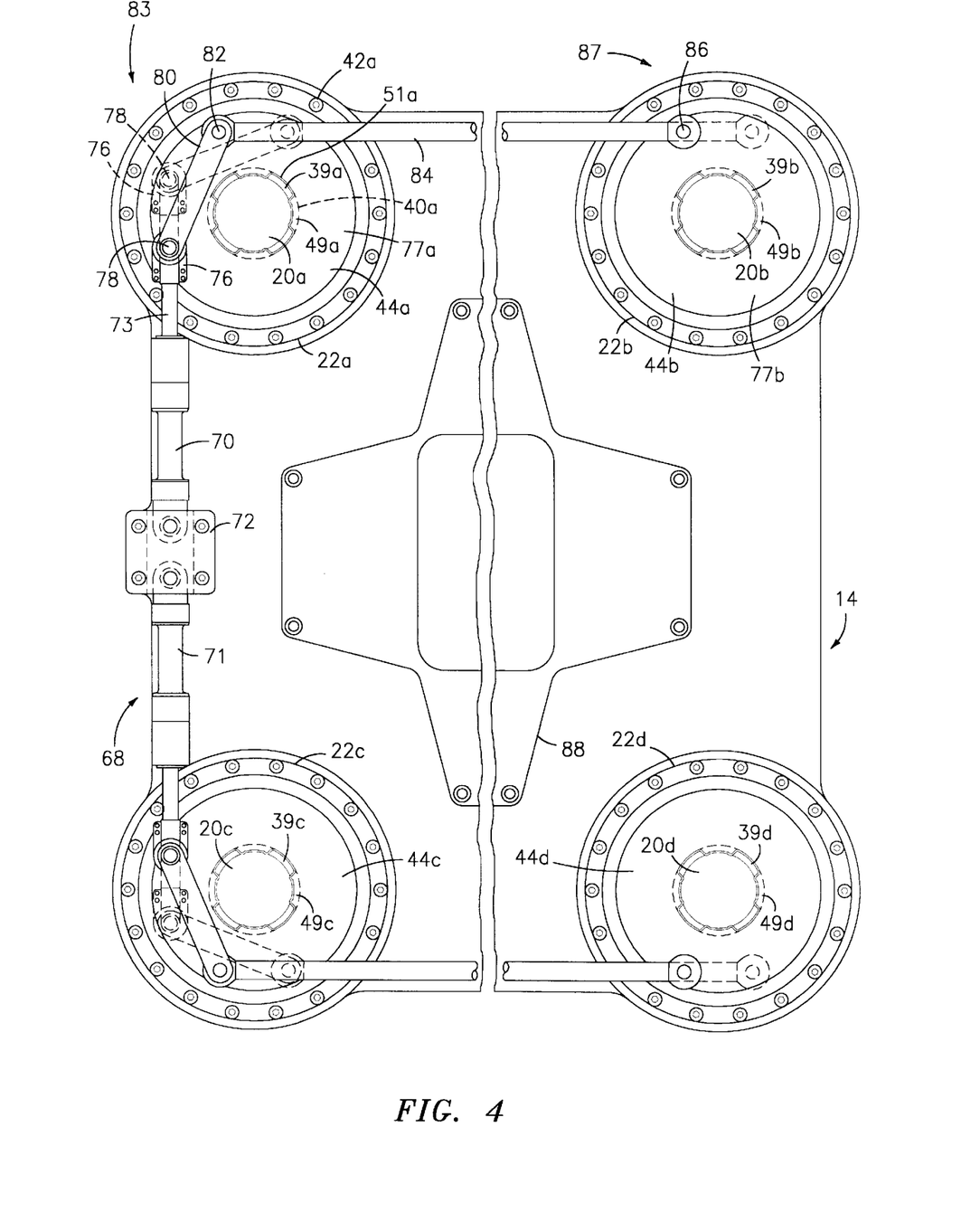
FIG. 4 is an end view of an injection molding machine in accordance with the principles of the present invention showing the securing/clamping assemblies and rotational mechanism therefor.

Rotational mechanism 68 is used for rotating securing/clamping assemblies 22a–22d and is substantially the same as the rotational mechanism (not shown) used with securing/clamping assemblies 23a–23d. Accordingly, only rotational mechanism 68 is described in detail, it being understood that the description applies equally to the rotational mechanism used with securing/clamping assemblies 23a–23d.

As shown in the end view of FIG. 4 where securing/clamping assemblies 22a–22d are shown positioned in movable platen 14, rotational mechanism 68 is preferably in the form of a linkage assembly which extends between and is connected to all four securing/clamping assemblies 22a–22d on the movable end platen 14. Rotational mechanism 68 specifically connects securing/clamping assemblies 22a and 22b and securing/clamping assemblies 22c and 22d. The linkage assembly of rotational mechanism 68 includes one or more, preferably a pair, of piston/cylinder mechanisms 70 and 71 attached to bracket 72 between two of the securing/clamping assemblies, i.e. securing assemblies 22a and 22c.

Both piston/cylinder mechanisms 70 and 71 and associated linkage are substantially the same and accordingly only one piston/cylinder assembly 70 and associated linkage will be described in detail, it being understood that the description applies equally to assembly piston/cylinder assembly 71 wherein assembly 71 is substantially the mirror image of assembly 70.

The non-moving end of piston/cylinder assembly 70 is pivotally attached to bracket 72 and piston rod end 73 of piston/cylinder assembly 70 extends toward securing/clamping assemblies 22a–22b.

Piston rod 73 extends from piston/cylinder assembly 70 and is attached via a bearing assembly 76 to the end 77a of piston 44a. Linkage arm 80 is attached to bearing assembly 76 which pivots about stud 78 fastened to end surface 77a. Linkage arm 80 traverses a portion of end 77a of piston 44a and is connected at another stud 82 on end 77a. Studs 78 and 82 are preferably spaced from each other on the end surface 77a of piston 44a, approximately 90°. Stud 78 is preferably positioned on the outer side 83 of the vertical centerline of securing/clamping assembly 22a. A second linkage arm 84 extends from stud 82 which connects securing/clamping assemblies 22a and 22b and is attached to the end surface 77b of piston 44b. Linkage arm 84 is pivotally attached to securing/clamping assembly 22b at a stud 86, wherein stud 86 is positioned on securing/clamping assembly 22b adjacent the outer side 87 of the vertical centerline of securing/clamping assembly 22b.

Figure 6B:
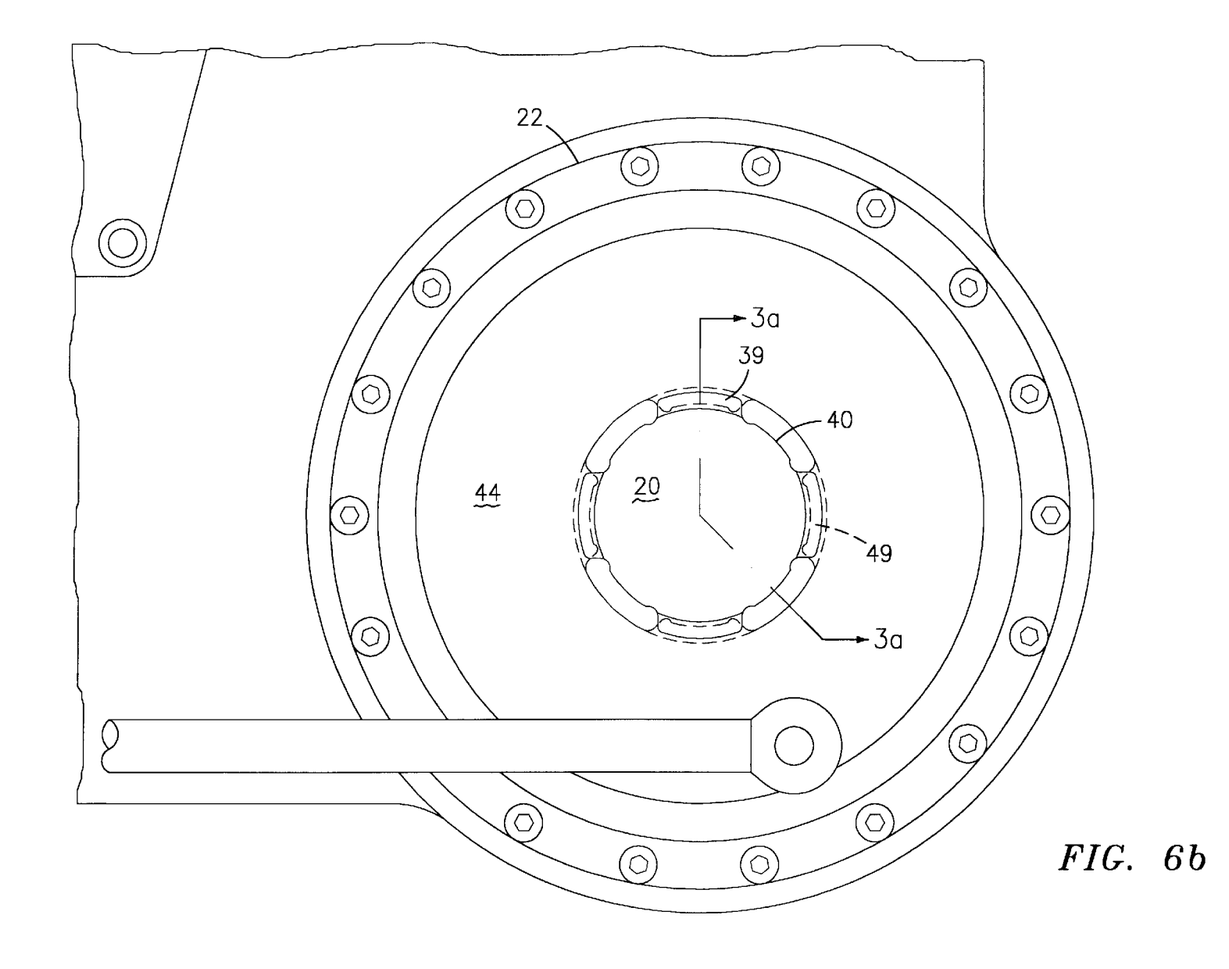
FIG. 6b is an enlarged view of the rotational mechanism shown in FIG. 4 in the engaged position.

The dotted lines in FIG. 4 indicate movement of rotational mechanism 68 upon the actuation of piston/cylinder assemblies 70 and 71. The solid lines show the pistons in the unextended position with the inner strips of teeth 49a–49d of the pistons 44a–44d being unengaged with outer strips of teeth 39a–39d of tie bars 20a–20d. The dotted lines of the securing/clamping assemblies also show the inner strips of teeth 49a–49d of pistons 44a–44d engaged with the outer strips of teeth 39a–39d of tie bars 20a–20d. This engagement and disengagement is shown in more detail in FIGS. 6a and 6b, where FIG. 6a shows the securing/clamping assembly 22d in the disengaged position, i.e. teeth 39d and 49d unmeshed and FIG. 6b shows the securing/clamping assembly 22d in the engaged position with teeth 39d and 49d meshed. Accordingly, upon simultaneous actuation of piston/cylinder assemblies 70 and 71, inner strips of teeth 49a–49d, securing/clamping assemblies 22a–22d, respectively, can be synchronously engaged and disengaged with outer strips of teeth 39a–39d of tie bars 22a–22d, respectively, so as to lock movable platens 14 and 16 into substantially closed positions prior to the application of the desired clamping force via pressure against surfaces 62a–62d (62b–62d not shown) of pistons 44a–44d (44b–44d not shown), as shown in FIG. 3a.

The total available travel of piston 44 is at least the total of the pitch of the strips of teeth plus the clearance plus the maximum elongation of the tie bars. This allows shut height to be adjusted to any point between maximum and minimum even though engagement between tie bar teeth and piston teeth is of a fixed pitch.

While the rotational mechanism 68 has been described in detail as a linkage assembly, it is to be understood that other types of rotational mechanisms can be used such as, for example, sprockets, belts and chains, directly synchronized drives, and rack and pinion assemblies.

While the securing/clamping assemblies 22 of the present invention have been described for use with a tandem injection molding machine having a fixed center platen and two movable end platens, the securing/clamping assemblies are by no means limited to such use. Assemblies 22 can be incorporated in a manner similar to as described above for tandem type machines having a fixed end platen and movable platens movable toward the fixed end platen. Use of the securing/clamping assemblies is also feasible and contemplated for other variations of tandem machines.

Further, the securing/clamping assemblies can be equally used with a non-tandem machines 110, as shown in FIG. 5, i.e. injection molding machines having a single stationary mold platen 114 and one movable platen 112 or any other variation thereof. Accordingly, FIG. 5 is indicative of the use of the securing/clamping assemblies 22, therein assemblies 122, of the present invention with a non-tandem machine 110. The above description of the securing/clamping assemblies, rotational mechanisms, and the additional parts of the injection molding machine, are equally applicable to a non-tandem machine and is incorporated herein. Alternatively, assemblies 122 can be mounted on fixed platen 114 and tie bars attached to moving platen 112.

Referring now to FIGS. 1–4, and 6 the operation of the injection molding machine 10 in accordance with the principles of the present invention will be described. For the sake of simplicity, multiple securing/clamping assemblies and associated elements and multiple tie bars and associated elements will be referred to by number designation only and not the letter designations, unless otherwise noted.

In operation of tandem machine 10 as shown in FIGS. 1 and 2, rotational mechanism for each movable platen 14 and 16, as shown in FIG. 4, is set such that the plurality of securing/clamping assemblies 22 and 23, respectively, are unengaged with tie bars 20 and 21, respectively, i.e. 20 wherein the slots of the tie bars and securing/clamping assemblies are in alignment with the teeth of the securing/clamping assemblies and tie bars, respectively, thus allowing movement of movable platens 14 and 16 relative the tie bars and center fixed platen 12, as shown in FIG. 6a. By way of example only, movable platen 14 is first moved into the mold closed position as shown in FIG. 2, while movable platen 16 remains in a mold open position as also shown in FIG. 2. In achieving the mold closed position of the mold halves 26 and 29, as shown in FIG. 2, movable mold half 29 is moved via positioning cylinder 25 into engagement with first stationary mold half 26. In addition, injection unit 18 is locked in engagement with locking flange 36 of first hot runner 32, as shown by the dotted lines of FIG. 1 or alternatively, a distribution valve is used to direct flow to mold halves 26 and 29. Accordingly, during movement of movable end platen 14, rotational mechanism 68 for movable platen 14 is in the position as shown by the solid lines in FIG. 4. and securing/clamping assemblies 22 are movable relative to tie bars 20.

When first stationary mold half 26 and first movable mold half 29 are in the position shown in FIGS. 1 and 2, rotational mechanism 68 is actuated via piston/cylinder assemblies 70 and 71 such that the inner strips of teeth 49a of pistons 44a are rotated into engagement with outer strips of teeth 39a of tie bars 20. The initial position of the mold halves is achieved by moving the movable platen in a stepwise manner until strips of teeth 39a and 49a are in position for engagement. The engaged position of the rotational mechanism 68 is represented by the dotted lines shown in FIG. 4. Such engagement of strips 39a of tie bar 20a with inner strips of teeth 49a of pistons 44 is also shown in the upper half of FIG. 3a and in FIG. 6b.

With the inner strips 49a engaged with outer strips of teeth 39a and the first stationary mold half 26 being positioned in molding engagement with first movable mold half 29, pressure can be applied to the mold halves via the securing/clamping assemblies 22.

Accordingly, referring again to FIG. 3a, hydraulic pressure or the like is provided in bore 37a against longitudinal transverse surfaces 62a of each securing/clamping assembly 22. The hydraulic pressure against surface 62a forces first stationary mold half 26 and first movable mold half 29 sealably together in preparation for injection molding. As force between the mold halves is maintained via each securing/clamping assemblies 22, melt is injected via injection unit 18 through first hot runner 32 for facilitating molding. Once molding is complete, hydraulic pressure is removed from cavities 66a and is applied in cavities 65a against surfaces 67a of pistons 44a of securing/clamping assemblies 22, preferably using the axial clearance between the engaged teeth for slight relative movement, to break apart the molding halves. The surface area of surface 67a is smaller than the surface area of surfaces 62a since less force is required to break the mold halves. Once the mold halves are broken apart, the teeth must be disengaged before mold halves can be moved by cylinder 25 to the open position. Once disengagement of the teeth has been accomplished, positioning cylinder 25 moves the first movable mold half 29 away from first stationary mold half 26 so that the molded unit may be ejected by an ejection system 88 known in the art.

For the tandem machine 10 as shown in FIG. 1, as securing/clamping assemblies 22 are released and movable mold half 29 is moved to the open position, the other movable mold half 31 is closed via cylinder 27, and clamped via securing/clamping assemblies 23, via the same operation as discussed above for mold halves 26 and 29 and securing/clamping assemblies 22, wherein injection unit 18 is moved into locking engagement with locking flange 36 of second hot runner 34, or valve direction is changed for injecting melt and forming a molded unit in mold halves 30 and 31. The securing/clamping assemblies 23 function in the same manner as described above.

Mold halves 26, 29 and 30, 31 can be opened, closed, clamped and unclamped independently of each other. Each side of stationary platen 12 can be operated as a completely independent machine or they can be coordinated and synchronized in any one of a number of ways.

FIG. 5 shows a single mold injection molding machine 110 having stationary platen 114 and one movable platen 112. Injection molding machine 110 includes securing/clamping assemblies 122, similar to as described above for the tandem machine, in movable platen 112, and is designed and functions the same as described above with regard to securing/clamping assemblies 22, tie bars 20 and rotating mechanisms 68, except only one set of securing/clamping assemblies, tie bars, and one rotating mechanism is used. Thus, FIG. 5 shows tie bars 120a and 120c, clamping and securing assemblies 122a and 122c, positioning cylinder 125, mold halves 126 and 129, bores 135a and 135c for the tie bars, similar to FIGS. 1 and 2.

The primary advantage of this invention is that an improved tie bar securing and mold clamping mechanism is provided for use with both tandem and single mold injection molding machines. Still another advantage of this invention is that an improved securing/clamping assembly is provided for use with both tandem and single mold injection molding machines which provides dual purpose of securing with the tie bars and clamping mold halves closed for injection molding. And still another advantage of this invention is that an improved securing/clamping assembly is provided for use in both securing with the tie bars and clamping mold halves, for use with injection molding machines and which is actuated via rotational movement.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An injection molding machine, comprising:
   a stationary platen including at least one stationary mold half;
   a movable platen movable relative said stationary platen and having a mold half adapted to engage said stationary mold half to form a first mold;
   tie bars extending between said stationary platen and movable platens;
   annular body members for each tie bar securing each of said tie bars to at least one of said platens, each of said annular body members attached to at least one of said platens, and each of said annular body members including a means for securing said annular body members to said tie bars, and having a structure which is movable as a single unit;
   wherein said annular body members are operative to convey a clamping force to said mold halves, and are also operative to convey a mold break force to said mold halves; and
   engagement means of said body members placing said body members in and out of locking engagement with said tie bars so that when said engagement means is out of locking engagement with said tie bars, said platens are relatively movable,
   including bores in at least one of said platens, wherein said body members are situated at least in part in said bores, and wherein said body members have outer surfaces, and wherein said body members are shaped to form a cavity between the outer surfaces and said bores and to form surfaces extending substantially transverse to a clamping direction of said platens, and means for introducing pressurized fluid into said cavity.

2. A machine according to claim 1, wherein said engagement means is activated independently of said tie bars.

3. A machine according to claim 1, including means for engaging said tie bars which extend through at least one of said platens, wherein said engagement means cooperates with said means for clamping.

4. A machine according to claim 1, wherein said body members are rotatable relative to said tie bars for placing said engagement means in and out of engagement with said tie bars.

5. A machine according to claim 1, wherein said body members form a cavity and form surfaces extending substantially transverse to a clamping direction of said platens, and means for introducing pressurized fluid into said cavity.

6. An injection molding machine, comprising:
   a stationary platen including at least one stationary mold half;
   a movable platen movable relative said stationary platen and having a mold half adapted to engage said stationary mold half to form a first mold;
   tie bars extending between said stationary platen and movable platens;
   annular body members for each tie bar securing each of said tie bars to at least one of said platens, each of said annular body members attached to at least one of said platens, and each of said annular body members including a means for securing said annular body members to said tie bars, and having a structure which is movable as a single unit;

wherein said annular body members are operative to convey a clamping force to said mold halves, and are also operative to convey a mold break force to said mold halves; and engagement means of said body members placing said body members in and out of locking engagement with said tie bars so that when said engagement means is out of locking engagement with said tie bars, said platens are relatively movable, wherein said body members are rotatable into locking engagement with said tie bars, and including strips of teeth of said tie bars which engage strips of teeth of said body members, and including slots of said tie bars which align with slots of said body members.

7. A machine according to claim 6, including protrusions of said tie bars engageable with said engagement means.

8. A machine according to claim 7, including a first toothed surface of said tie bars engageable with said engagement means.

9. A machine according to claim 8, wherein said annular body members are positioned coaxially relative said tie bars, and wherein said body members include a toothed surface adjacent said tie bars, with said toothed surface mating with said first toothed surface.

10. A machine according to claim 6, wherein said body members have an intermediate position such that clearances are provided between teeth prior to rotation into locking engagement.

11. A tandem injection molding machine, comprising:

a stationary platen including at least two stationary mold halves, said at least two stationary mold halves located on opposed sides of said stationary platen;

a first movable platen movable relative to said stationary platen and having a mold half adapted to engage one of said stationary mold halves to form a first mold, and a second movable platen movable toward said stationary platen and including a mold half adapted to engage the other of said stationary mold halves to form a second mold;

tie bars extending between and connecting said stationary platen, said first movable platen and said second movable platen;

annular body members for each tie bar securing each of said tie bars to at least one of said platens, each of said annular body members attached to at least one of said platens, and each of said annular body members including a means for securing said annular body members to said tie bars, and having a structure which is movable as a single unit;

wherein said annular body members are operative to convey a clamping force to said mold halves, and are also operative to convey a mold break force to said mold halves; and engagement means of said body members placing said body members in and out of locking engagement with said tie bars so that when said engagement means is out of locking engagement with said tie bars, said platens are relatively movable, including bores in at least one of said platens, wherein said body members are situated at least in part in said bores, and wherein said body members have outer surfaces, and wherein said body members are shaped to form a cavity between the outer surfaces and said bores and to form surfaces extending substantially transverse to a clamping direction of said platens, and means for introducing pressurized fluid into said cavity.

12. A machine according to claim 11, wherein said engagement means is activated independently of said tie bars.

13. A machine according to claim 11, including means for engaging said tie bars which extend through at least one of said platens, wherein said engagement means cooperates with said means for clamping.

14. A machine according to claim 11, wherein said body members are rotatable relative to said tie bars for placing said engagement means in and out of engagement with said tie bars.

15. A machine according to claim 11, wherein said body members form a cavity and form surfaces extending substantially transverse to a clamping direction of said platens, and means for introducing pressurized fluid into said cavity.

16. A tandem injection molding machine, comprising:

a stationary platen including at least two stationary mold halves, said at least two stationary mold halves located on opposed sides of said stationary platen;

a first movable platen movable relative to said stationary platen and having a mold half adapted to engage one of said stationary mold halves to form a first mold, and a second movable platen movable toward said stationary platen and including a mold half adapted to engage the other of said stationary mold halves to form a second mold;

tie bars extending between and connecting said stationary platen, said first movable platen and said second movable platen;

annular body members for each tie bar securing each of said tie bars to at least one of said platens, each of said annular body members attached to at least one of said platens, and each of said annular body members including a means for securing said annular body members to said tie bars, and having a structure which is movable as a single unit;

wherein said annular body members are operative to convey a clamping force to said mold halves, and are also operative to convey a mold break force to said mold halves; and engagement means of said body members placing said body members in and out of locking engagement with said tie bars so that when said engagement means is out of locking engagement with said tie bars, said platens are relatively movable, wherein said body members are rotatable into locking engagement with said tie bars, and including strips of teeth of said tie bars which engage strips of teeth of said body members, and including slots of said tie bars which align with slots of said body members.

17. A machine according to claim 16, including protrusions of said tie bars engageable with said engagement means.

18. A machine according to claim 17, including a first toothed surface of said tie bars engageable with said engagement means.

19. A machine according to claim 18, wherein said annular body members are positioned coaxially relative said tie bars, and wherein said body members include a toothed surface adjacent said tie bars, with said toothed surface mating with said first toothed surface.

20. A machine according to claim 16, wherein said body members have an intermediate position such that clearances are provided between teeth prior to rotation into locking engagement.

21. A securing and clamping assembly for clamping platens of an injection mold machine, comprising:

tie bars extending between and connecting said platens;

first and second mold halves carried by said platens and engaging each other to form a first mold;

annular body members for each tie bar securing each of said tie bars to at least one of said platens, each of said annular body members attached to at least one of said platens, and each of said annular body members including a means for securing said annular body members to said tie bars, and having a structure which is movable as a single unit;

wherein said annular body members are operative to convey a clamping force to said mold halves, and are also operative to convey a mold break force to said mold halves; and engagement means of said body members placing said body members in and out of locking engagement with said tie bars so that when said engagement means is out of locking engagement with said tie bars, said platens are relatively movable, including bores in at least one of said platens, wherein said body members are situated at least in part in said bores, and wherein said body members have outer surfaces, and wherein said body members are shaped to form a cavity between the outer surfaces and said bores and to form surfaces extending substantially transverse to a clamping direction of said platens, and means for introducing pressurized fluid into said cavity.

22. An assembly according to claim 21, wherein said engagement means is activated independently of said tie bars.

23. An assembly according to claim 20, including means for engaging said tie bars which extend through at least one of said platens, wherein said engagement means cooperates with said means for clamping.

24. An assembly according to claim 21, wherein said body members are rotatable relative to said tie bars for placing said engagement means in and out of engagement with said tie bars.

25. An assembly according to claim 21, including protrusions of said tie bars engageable with said engagement means.

26. An assembly according to claim 25, including a first toothed surface of said tie bars engageable with said engagement means.

27. An assembly according to claim 26, wherein said annular body members are positioned coaxially relative said tie bars, and wherein said body members include a toothed surface adjacent said tie bars, with said toothed surface mating with said first toothed surface.

28. An assembly according to claim 21, wherein said body members form a cavity and form surfaces extending substantially transverse to a clamping direction of said platens, and means for introducing pressurized fluid into said cavity.

29. A securing and clamping assembly for clamping platens of an injection mold machine, comprising:

tie bars extending between and connecting said platens;

first and second mold halves carried by said platens and engaging each other to form a first mold;

annular body members for each tie bar securing each of said tie bars to at least one of said platens, each of said annular body members attached to at least one of said platens, and each of said annular body members including a means for securing said annular body members to said tie bars, and having a structure which is movable as a single unit;

wherein said annular body members are operative to convey a clamping force to said mold halves, and are also operative to convey a mold break force to said mold halves; and engagement means of said body members placing said body members in and out of locking engagement with said tie bars so that when said engagement means is out of locking engagement with said tie bars, said platens are relatively movable, wherein said body members are rotatable into locking engagement with said tie bars, and including strips of teeth of said tie bars which engage strips of teeth of said body members, and including slots of said tie bars which align with slots of said body members.

30. An assembly according to claim 29, wherein said body members have an intermediate position such that clearances are provided between teeth prior to rotation into locking engagement.

* * * * *

UNITED STATES PATENT AND TRADEMARK OFFICE
CERTIFICATE OF CORRECTION

PATENT NO.   : 5,928,684
DATED        : July 27, 1999
INVENTOR(S)  : PIERRE GLAESENER ET AL.

It is certified that error appears in the above-identified patent and that said Letters Patent is hereby corrected as shown below:

In Column 13, claim 23, line 32, "claim 20" should read --claim 21--.

Signed and Sealed this

Twenty-eighth Day of December, 1999

Attest:

Q. TODD DICKINSON

Attesting Officer          Acting Commissioner of Patents and Trademarks